(12) United States Patent
Yasuda et al.

(10) Patent No.: US 6,924,929 B2
(45) Date of Patent: Aug. 2, 2005

(54) MICROSCOPE APPARATUS

(75) Inventors: Nakahiro Yasuda, Chiba (JP);
Yoshihiro Honma, Chiba-ken (JP)

(73) Assignees: National Institute of Radiological Sciences, Chiba (JP); Seiko Precision Inc., Narashino (JP)

( * ) Notice: Subject to any disclaimer, the term of this patent is extended or adjusted under 35 U.S.C. 154(b) by 19 days.

(21) Appl. No.: 10/401,359

(22) Filed: Mar. 28, 2003

(65) Prior Publication Data

US 2003/0184855 A1 Oct. 2, 2003

(30) Foreign Application Priority Data

Mar. 29, 2002 (JP) ..................................... 2002-097497
Mar. 29, 2002 (JP) ..................................... 2002-097498
Mar. 29, 2002 (JP) ..................................... 2002-097499

(51) Int. Cl.[7] ............................................. G02B 21/00
(52) U.S. Cl. ..................................... 359/383; 250/201.3
(58) Field of Search ................................ 359/368, 382, 359/383, 391, 392, 363; 250/201.3

(56) References Cited

U.S. PATENT DOCUMENTS 4,958,920 A * 9/1990 Jorgens et al. ............... 359/392
6,049,421 A * 4/2000 Raz et al. ..................... 359/394
6,677,565 B1 * 1/2004 Wahl et al. ................ 250/201.3
6,711,283 B1   3/2004 Soenksen ..................... 382/133

* cited by examiner

Primary Examiner—Mark A. Robinson
Assistant Examiner—Alessandro Amari
(74) Attorney, Agent, or Firm—Adams & Wilks

(57) ABSTRACT

A microscope apparatus has a sample table for supporting a sample and being mounted to undergo movement in a horizontal direction. A line sensor acquires a line image for each of a series of measuring positions of the sample in accordance with movement of the sample at a constant speed by one measuring width of the line sensor in the horizontal direction. An image processing device produces an image of the sample based on the line images acquired by the line sensor. A focusing device has a light-projecting member for projecting light onto the sample at a position forward of a leading side of an imaging range of the line sensor in the horizontal direction to prevent light reflected by the sample as a result of the projected light from being incident on and interfering with the line images acquired by the line sensor.

18 Claims, 9 Drawing Sheets

MICROSCOPE APPARATUS

BACKGROUND OF THE INVENTION

1. Field of the Invention

The present invention relates generally to an imaging microscope and, more particularly, to a microscope for examining the amount and direction of incident radiation such as neutrons or the like, or for examining cellular tissue or other specimens in a hospital or laboratory environment, and which performs imaging of a sample using a line sensor.

2. Discussion of Related Art

In recent years, there has been an increase in the number and types of facilities which produce radiation for various reasons, such as hospitals, radiotherapy clinics, and atomic power plants. Associated with this increase is a heightened need for measuring personnel at such locations for exposure to harmful amounts of radiation.

Conventionally, radiation exposure testing has involved attaching a sample material to a person's coat or other article of clothing to measure an amount of incident radiation on the sample, as disclosed in JP-A-11-174157, JP-A-2001-42038, and numerous other references. The measuring means employed by such devices is generally as follows.

The sample is formed of an organic plastic, or the like, which, if exposed to radiation, suffers damage in molecular bonds. If the damaged part is etched with a predetermined solution, it produces fine etch pits. The etch pits are different in shape depending upon the amount or direction of incident radiation. Accordingly, by examining and adding the form of etch pits caused on the sample by use of a microscope, measurement of the amount and direction of incident radiation can be made.

Meanwhile, in medical institutions such as hospitals or university laboratories, examination of cellular tissue such as cancerous cells and the like is frequently conducted using optical and other types of microscopes.

While it is possible to conduct visual examination, determination, or the like, of etch pit forms, cellular tissue, or the like, using an optical microscope, it entails a huge labor cost and constitutes a great burden to conduct such examination and determination on a large number of samples. Furthermore, variation can occur in such examinations or determinations due to the individual differences between persons who conduct the examinations or make such determinations. For this reason, it has been proposed to attach a two-dimensional charge coupled device ("CCD") camera to a microscope so that an image acquired by the CCD camera is displayed on a computer screen to enable examination of the amount and direction of incident radiation, or to enable the examination of cellular tissue or other specimens. In addition, image processing means may also be used to perform automatic calculation of the amount and direction of incident radiation or the determination of a range, advancement, type, or the like, of cancerous cells or other specimen characteristics based on an image obtained by the microscope.

However, the two-dimensional CCD sensor that is used in the conventional CCD camera is provided vertically and horizontally with a planar array of devices, such as 600×600, such that there are approximately 3.5 billion charge coupled devices having one side length of 21 micrometers, for example. Accordingly, in the case of taking an image with a magnification of 30×, for example, it is possible to take, at one time, an image only in a range of 21 micrometers×600 pieces/30=0.42 square millimeters.

Consequently, there is a need to repeat imaging of the same sample while moving the 0.42-millimeter-squared imaging range sequentially from one end to the other thereof. In the meanwhile, in order to obtain a clear image screen, there is a need to stop the sample each time after moving it by one screen in order to take an acceptable image. It takes a great deal of time to take an image of samples within a predetermined region. Furthermore, in order to obtain a clear image, it is necessary to correctly set a focal length for each image. This is typically done using a two-dimensional CCD sensor to automatically set a focal length as is widely done in CCD cameras. However, the following problem exists in such automatic focal-length setting means. Namely, the focal adjustment on the typical CCD camera using a two-dimensional CCD sensor is set at a focal position where the taken image is the sharpest, i.e. exhibits intense contrast, which is an in-focus position. Accordingly, to carry out focal adjustment with a conventional two-dimensional CCD sensor, searching for the greatest contrast point requires examination of a maximum contrast value by performing measurements around a given focal point. Because of the need to examine around the focal point, there is a disadvantage in that a large amount of time is required for focal adjustment.

In addition, in order to obtain a clear image there is a need to accurately and swiftly adjust three factors including inclinations in both the X and Y directions and average focal length. The automatic focus adjustment used in a conventional microscope apparatus is performed by driving the objective lens using a motor or the like, or by using a focus adjusting drive means having two types of drive means including an inclination adjusting drive means and a focus adjusting drive means provided on the support base. When imaging of a sample is performed, there is a need to take an image by setting a particular range in the sample. Since the size often differs depending on the sample, there is a need to take an image within a range that does not jut out from the periphery of the sample, which may happen whenever changing of the sample takes place. Consequently, there is a need to set a start point 11a and end point 11b (see FIG. 7) of an imaging range before taking an image. Furthermore, when taking an image of a cellular tissue such as cancerous cells, a part of the sample where a cell of interest exists must be selected to set an image range.

Accordingly, it is an object of the present invention to provide a microscope apparatus capable of swiftly and accurately taking an image within a predetermined range of a sample when conducting an examination of a sample for purposes such as detecting the amount and direction of incident radiation or when examining cellular tissue or the like.

SUMMARY OF THE INVENTION

In order to achieve the foregoing object and others which will become more apparent to those of ordinarily skill in the art upon reading the specification, a microscope apparatus in accordance with a first aspect of the present invention is provided with a line sensor for imaging of a sample, image processing means for producing an image of the sample in accordance with a line image obtained by the line sensor, and focusing means having light-projecting means for providing a projection position on the sample in a vicinity of a range to be imaged by the line sensor.

The sample may be a track-detecting solid matter used for measuring the amount or direction of incident radiation, or cellular tissue used for examining cancerous cells or the like.

However, the sample is not limited to these examples and may comprise any material having a characteristic in a range which may be measured by a microscope. The line sensor is an image sensor having a linear arrangement, for example, of several thousand Charge Coupled Devices (CCDS) in one column. This may include a linear arrangement of single CCDS or a linear arrangement of a plurality (such as two to ten) of CCDs. The image processing means preferably comprises a known image processing means of the type in which individual line images taken by the line sensor are superposed to produce an image in a predetermined range of a sample or to compare/collate such images. The focusing means having a light-projecting means is preferably a known focusing means which, for example, projects a circular laser spot onto a sample and measures a deviation from a proper focal length based on the deformation of laser light reflected by the sample.

In accordance with a second aspect of the present invention, the projection position of the circular laser spot of the first aspect of the invention is located at a position forward of the line sensor.

By the foregoing structure, when sequentially taking images over a sample measuring range using the line sensor, it is possible to measure and adjust a focal length of the subject using the focusing means prior to imaging the subject using the line sensor. Furthermore, light projected by the light projecting means of the focusing means is positively prevented from being incident on a line image acquired by the image sensor.

In accordance with a third aspect of the present invention, the light-projecting means of the first aspect of the invention has a forward light-projecting means for projecting light to a position that is forward of the line sensor and a backward light projecting means for projecting light to a position that is backward of the line sensor.

As used herein, the position forward of the line sensor signifies a position on the sample forward of a leading side of an imaging range of line sensor in the direction of horizontal movement, and the position backward of the line sensor signifies a position on the sample rearward (or backward) of a trailing side of the imaging range of line sensor in the direction of horizontal movement (e.g., on the side opposite the leading side).

By the foregoing structure, when sequentially imaging using the line sensor while moving the sample, even if the moving direction is changed, for example, from left-to-right to right-to-left to carry out two-way scanning, it is possible to measure and adjust the focal length of a subject immediately prior to imaging of the subject by the line sensor. Furthermore, the light projected light by the light-projecting means is positively prevented from being incident on a line image.

A microscope apparatus in accordance with a fourth aspect of the present invention, comprises a support base for supporting a sample, an optical microscope for magnifying the sample, a line sensor for imaging the magnified sample as a line image, and image processing means for producing an image of the sample based on a line image taken by the line sensor, wherein the support base has adjusting means for adjusting an inclination thereof and a focal length of the microscope.

In accordance with a fifth aspect of the present invention, the adjusting means adjusts vertical positions at least at three points of the support base.

By the foregoing structure, it is possible to easily adjust the inclination and focal length of the sample.

In accordance with a sixth aspect of the present invention, the adjusting means is controlled by a signal from the focusing means.

By the foregoing structure, it is possible to accurately and swiftly adjust the inclination and focal length of the sample.

A microscope apparatus according to a seventh aspect of the present invention comprises an optical microscope for magnifying a sample, a line sensor for imaging the magnified sample as a line image, a two-dimensional charge coupled device for acquiring an image at an imaging position of the line sensor, and image processing means for producing an image of the sample based on a line image taken by the line sensor.

By the foregoing structure, the following operational effect is obtained. By imaging the sample with using the line sensor, sample imaging can be done quickly. By using a two-dimensional CCD sensor capable of imaging two-dimensional spread, it is possible to quickly and easily set an imaging region in the sample.

In particular, although an imaging region of the sample can be considered set by using an image taken by the line sensor, the imaging range of the line sensor is extremely narrow in width. Accordingly, in a track-detecting solid matter for measuring the amount or direction of incident radiation, or the like, it is extremely difficult to set a measuring range that does not extend beyond an outer periphery of the track-detecting solid matter while confirming a peripheral part. Also, when conducting an examination of cellular tissue or the like, it is difficult to confirm a particular location or range at which cancerous cells or other cells of interest exist. However, use of a two-dimensional CCD sensor capable of imaging a two-dimensional spread, makes it easy to confirm a peripheral part of a track-detecting solid matter or a particular location or range of a cellular tissue, or the like. Consequently, in accordance with the present invention, the provision of a two-dimensional CCD sensor in addition to the line sensor allows for quick and easy setting of an in-sample imaging range.

DETAILED DESCRIPTION OF THE PREFERRED EMBODIMENTS

Figure 1:
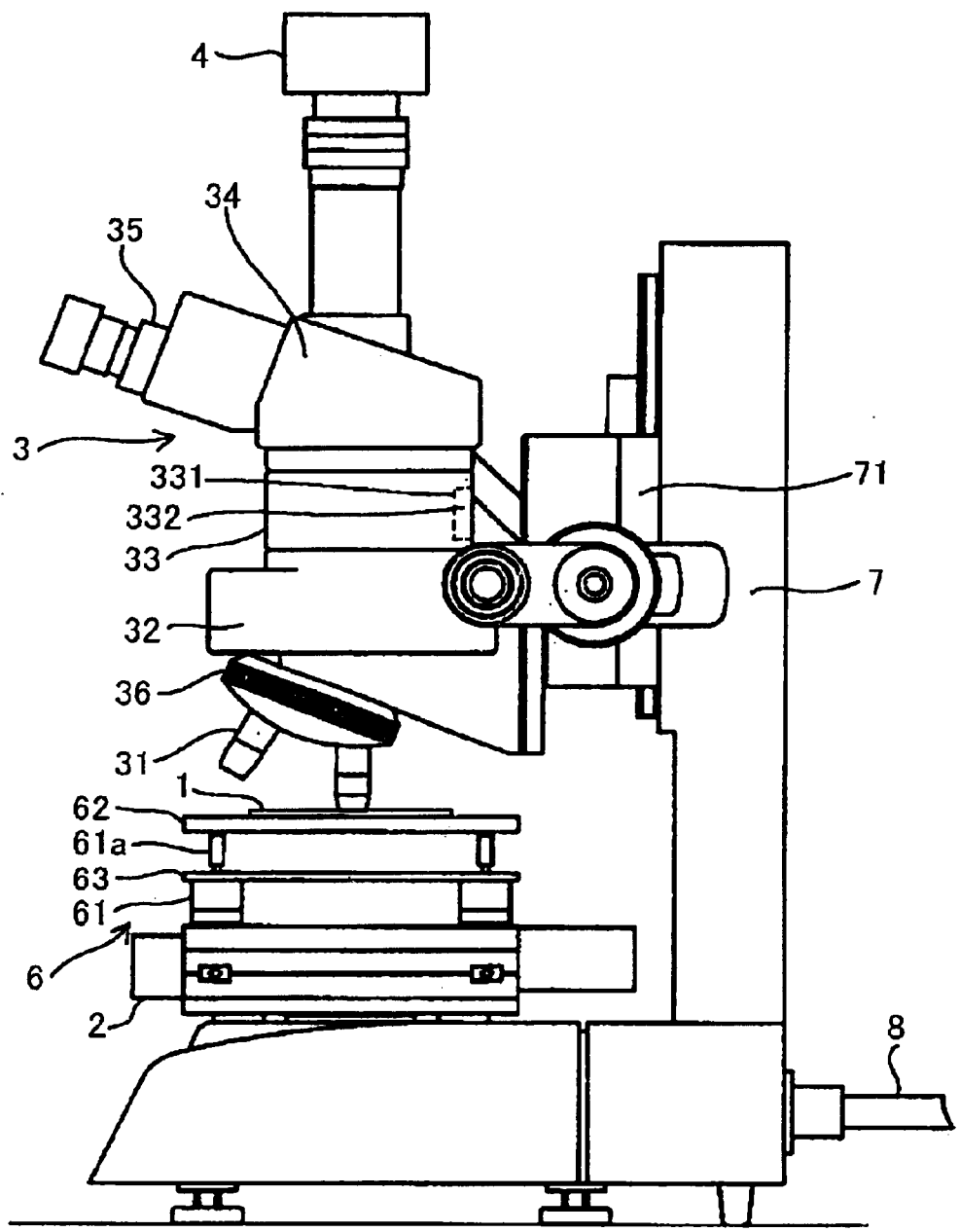
FIG. 1 is a partial side view of a microscope apparatus in accordance with one embodiment of the present invention.
Figure 2:
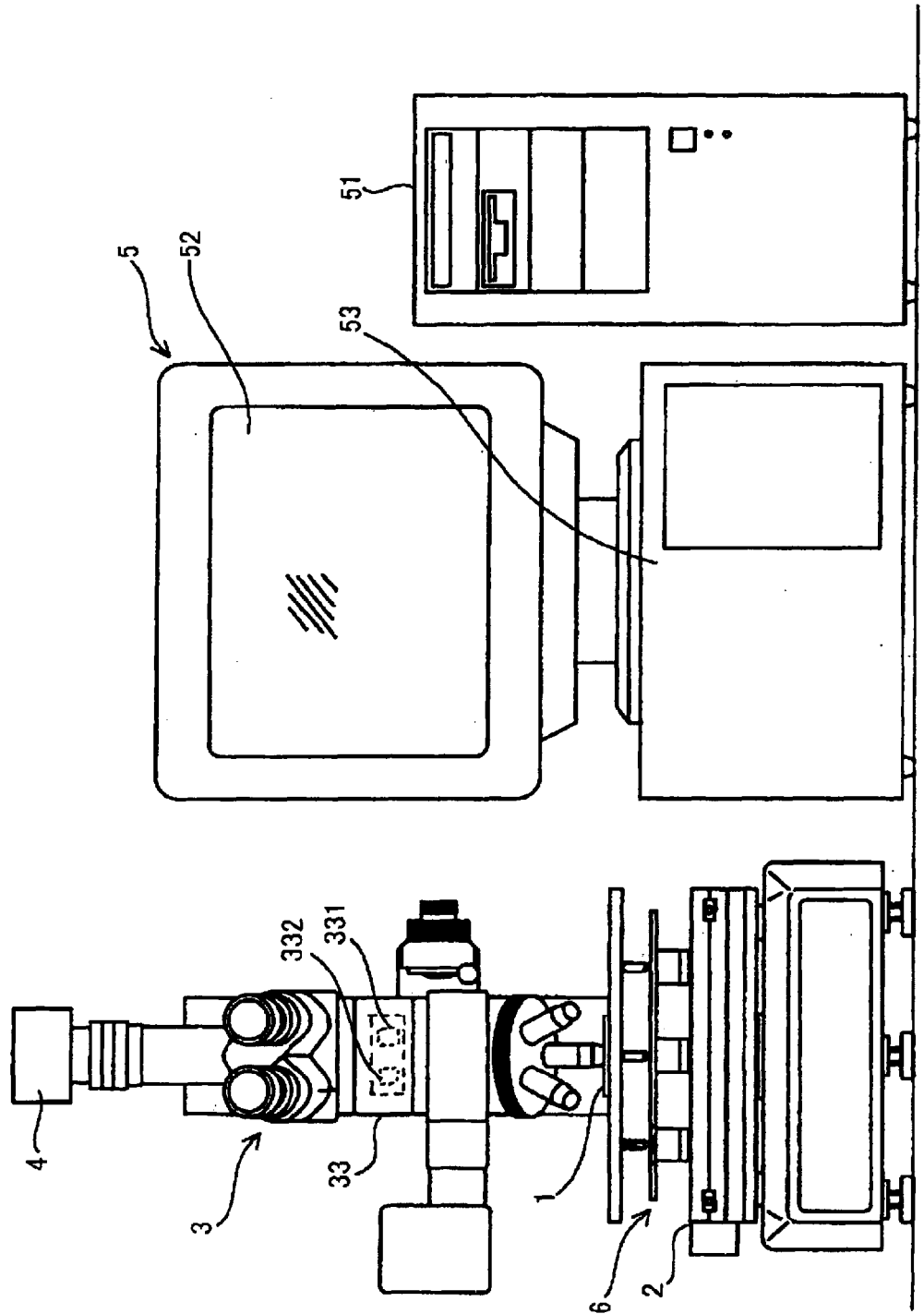
FIG. 2 is a front view of the microscope apparatus of FIG. 1.

With reference to attached FIGS. 1 to 3, a microscope apparatus according to the present invention will be explained in connection with use as a radiation track detector. The radiation track detector has a moving means 2 for moving a track-detecting solid matter 1 serving as a sample, a microscope 3 for magnifying the track-detecting solid matter 1, a line sensor 4 for imaging the magnified solid matter 1 for track detection as a line image, and determining means 5 for preparing an image of the solid matter 1 for track detection from the line image and determining an amount and direction of incident radiation from the image.

The moving means 2 is provided with a tilting table 6 serving as a support base for supporting the track-detecting solid matter 1 and adjusting its inclination and focal length. The moving means 2 and the microscope 3 are respectively supported by a frame 7 having an L-shape. The moving means 2 is arranged on a horizontal part of the L-shaped frame 7 to horizontally move the tilting table 6 on which is placed the track-detecting solid matter 1 in left/right and forward/backward directions by a linear motor. The use of a linear motor for this purpose is well known in the art. Such motors typically comprise an armature that moves over a permanent magnet arranged in a strip form, so that high-speed driving, accurate response and accurate positioning are possible. The linear motor is remotely controlled by a computer to move the track-detecting solid matter 1 to a predetermined position. Meanwhile, in the vicinity of the linear motor, an encoder is also provided to feed back the movement amount of the tilting table 6 by the linear motor to the operation processing section 51.

In the presently described embodiment, the microscope 3 is comprised of an optical microscope having objective lenses 31, a lamp section 32 for illuminating the track-detecting solid matter 1, an auto-focusing AF unit 33, a lens barrel 34, and an eyepiece lens 35 for visual observation. Each of these elements will be described in greater detail below.

The objective lenses 31 include various magnification lenses such as 10× and 20× lenses, which are manually changed from one to another by a revolver 36. In order to obtain a clear image, the lamp section 32 bends light produced by a halogen lamp contained therein (not shown) at a right angle using a half-mirror. The light is bent to propagate along an optical axis of the microscope 3 and illuminates the track-detecting solid matter 1, thus intensifying the light reflected by the track-detecting solid matter 1. Also, in order to allow illumination at the back surface of the track-detecting solid matter 1, an optical fiber 8 is provided on the frame 7 which introduces the light from an externally provided halogen lamp (not shown).

The auto-focusing AF unit 33 has a focus means 331 having a laser projecting means and a two-dimensional CCD sensor 32. As better illustrated in FIG. 3, the laser projecting means has a forward light-projecting means having a laser-light projecting part 331b and a light-receiving section 331a, and a backward light-projecting means having a laser-light projecting part 331d and a light-receiving section 331c, which are respectively arranged on a printed board 333. The printed board 333 is attached to an inner wall surface of the AF unit 33. The laser light emitted by the light-projecting parts 331b, 331d is bent rectangularly by a lens system and half-mirror along the optical axis of the microscope 3 and projected to the track-detecting solid matter 1. Laser light reflected by the solid matter 1 travels in a reverse path and is detected by the respective light-receiving parts 331a, 331c.

Figure 4:
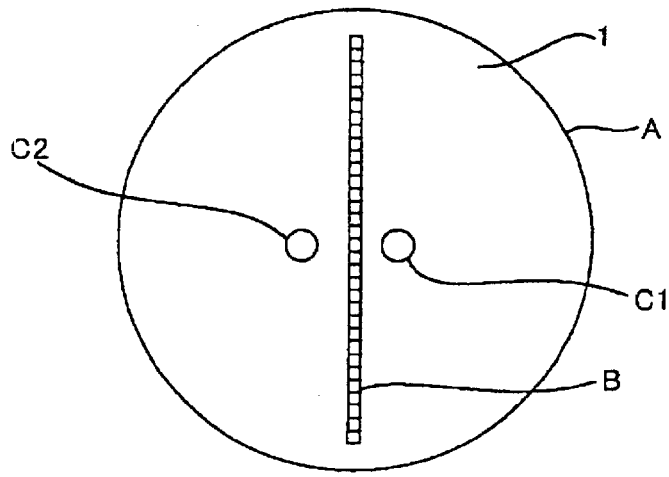
FIG. 4 is a figure of a field-of-view of the microscope apparatus of FIG. 1 showing a line-sensor imaging range and a laser-spot position.

As illustrated in FIG. 4, the light-projecting position on the track-detecting solid matter 1 is set on an upper surface of the track-detecting solid matter 1 lying within a field of view A of the microscope 3 at nearby positions C1, C2 on opposite sides of an imaging range B of the line sensor 4. The nearby position C1 is a light-projecting position of a laser light from the light-projecting part 331b of the forward light-projecting means, and the nearby position C2 is a light-projecting position of a laser light from the light-projecting part 331d of the backward light-projecting means. Thus, laser light reflected by the track-detecting solid matter 1 can be prevented from entering or interfering with a line image acquired by the line sensor 4. Furthermore, the focal distance to the imaging range B can be measured as correctly as possible by a measurement at opposite sides in the vicinity of such line. In addition, as described below, the focusing means 331 having the two set of laser projecting means can quickly adjust the inclination and focal length of the track-detecting solid matter 1. The reason for providing two sets of laser projecting means is to use them separately, such that when line images are sequentially imaged by the line sensor 4 while moving the track-detecting solid matter 1 in the X direction as hereinafter described, the nearby position C1 for laser projecting is positioned forward of the image range B of the line images during movement in the left and right directions. Due to this, even if the line sensor is scanned alternately in the left and right directions, the focal length can be adjusted on the forward side of the range to be imaged by the line sensor, allowing for correct focal adjustment.

Figure 3:
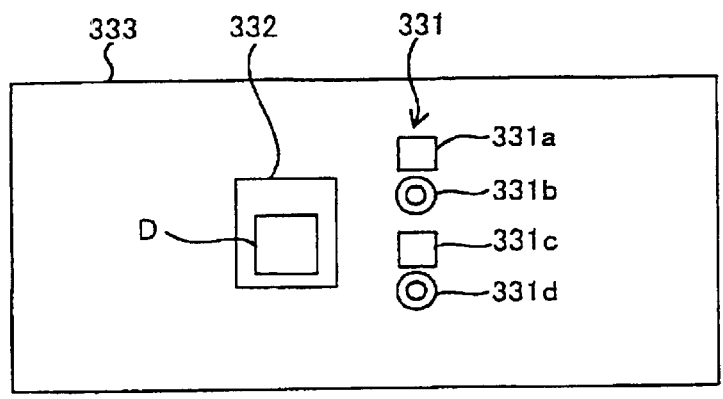
FIG. 3 is a schematic configuration diagram of the focusing means and the two-dimensional CCD sensor of the microscope apparatus of FIG. 1.
Figure 5:
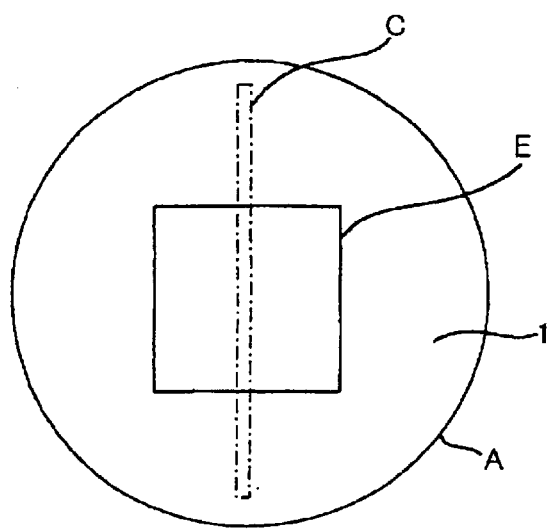
FIG. 5 is a figure of a field-of-view of the microscope apparatus of FIG. 1 showing the imaging range of a line-sensor and a two-dimensional CCD sensor.

The two-dimensional CCD sensor 332 is provided vertically and horizontally in a planar array, e.g., 600×600, such that there are approximately 3.5 billion charge coupled devices as used in a typical CCD camera with a side length of 21 μm and being attached to the printed board 333 as shown in FIG. 3. As illustrated in FIG. 5, the two-dimensional CCD sensor 332 images the surface of the track-detecting solid matter 1 through the half-mirror in an imaging range E of the two-dimensional CCD image sensor 332 sandwiching the imaging range C of the line image sensor. Incidentally, the region D shown in FIG. 3 is an imaging surface D of the two-dimensional CCD sensor 332. As hereinafter described, by performing imaging using the two-dimensional CCD sensor 332, it is possible to quickly designate an imaging region 11 of the track-detecting solid matter 1.

The lens barrel 34 supports an eyepiece lens 35 for visual observation and a line sensor 4. Furthermore, the lens barrel has a side that is attached to an upright part of the L-shaped frame 7 through a rack-and-pinion mechanism 71. Accordingly, when the track-detecting solid matter 1 is placed on the tilting table 6, the microscope 3 can be manually moved up and down by the rack-and-pinion mechanism 71. The eyepiece lens 35 for visual observation is arranged to facilitate visual observation by inclining the optical axis of the objective lens 31.

The line sensor 4 is accommodated in a case that is detachably mounted to a tip of the lens barrel 34. As a form of attachment, an F mount may be used, which is a standard mounting format used in single-lens reflex cameras for mounting a lens to a camera body. The line sensor 4 is structured by linearly arranging, one-by-one, approximately 4000 charge coupled devices having a side length of 7 µm. Consequently, in the case of an imaging magnification of 10×, it is possible to image, at one time, a range having a width of 7 µm/10=0.7 µm by a length of 7 µm×4000 pieces/10=2.8 millimeters. As hereinafter described, the line sensor 4 sequentially images the track-detecting solid matter 1 over the above-described range while the track-detecting solid matter 1 is being horizontally moved by the moving means 2, and delivers line image data for a plurality of lines imaged as described above to determining means 5, which will be described below, through a coupling cord (not shown).

The determining means 5 is comprised of a commercially available computer such as a PC, and has an operation processing section 51, a display section 52, and a memory 53 for storing line image data. As described below, the operation processing section 51 carries out setting of an imaging region on the track-detecting solid matter 1, movement of the moving means 2, adjustment of inclination of the tilting table 6 and focal length, image executing instructions of the line sensor 4 on the basis of a movement amount fed back from an encoder of the moving means 2, taking in of line image data acquired by the line sensor 4, preparing a whole image in the imaging region from the line image data, and determining an amount and direction of incident radiation from the whole image.

The structure and operation of the tilting table 6 will now be described. The tilting table 6 is provided with three ultrasonic motors 61 arranged at the points of a regular triangle, a flat table portion 62 supported at three points by vertical output shafts 61a of the ultrasonic motors, and a fixing member 63 fixing the mutual positions of the ultrasonic motors 61. In the present embodiment, the three ultrasonic motors 61 are provided as adjusting means for adjusting the inclination and vertical position of the tilting table 6. Incidentally, the tips of the vertical output shafts 61a abut a cavity formed on a back surface of the table part 62 to prevent the table part 62 from moving in the horizontal direction relative to the vertical output shafts 61a.

The ultrasonic motor 61 is a known device having an elastic member provided in abutment with a piezoelectric ceramic, which is characterized by undergoing controlled deformation in response to an applied voltage. In particular, a voltage is applied to the piezoelectric ceramic vibrator to cause it to undergo ultrasonic bending vibration on the elastic member, thereby rotating the output shaft 61a. Such devices have characteristics that are high in responsiveness and controllability but small in operating noise. The ultrasonic motor 61 used in the presently described embodiment is designed such that the output shaft 61a has a thread structure that causes the output shaft to rotate to cause vertical movement of the tilting table. As described below, the tilting table 6 is adjusted for setting the inclination and focal length of the track-detecting solid matter 1 under computer control based on the signal obtained the above-described focusing means 331. Because focal-length adjustment is also done by the ultrasonic motor 61 through utilizing the ultrasonic motor 61 for adjusting the inclination of the tilting table 6, eliminated is the need of a separately providing driving means for focal-length adjustment.

Figure 6:
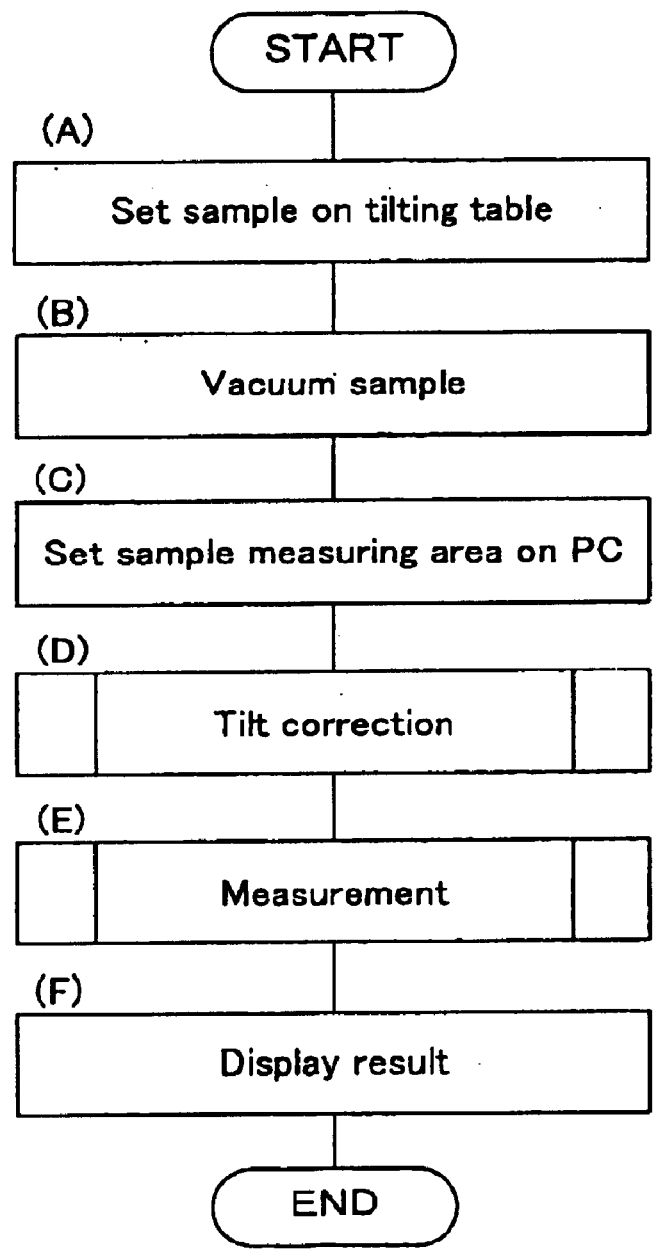
FIG. 6 is a flowchart illustrating a procedure for using the microscope apparatus of FIG. 1.

Referring now to FIGS. 6 to 10, an explanation will be provided of the use of the radiation track detector according to the present invention. As shown in FIG. 6, a track-detecting solid matter 1 as a subject of radiation measurement is first set on the upper surface of the table part 62 of the tilting table 6 (A). To prevent movement thereof, the track-detecting solid matter is absorption-fixed on the table part by vacuum means or the like (B). Next, a measuring region 11 of the track-detecting solid matter 1 is set by an input from the personal computer (C).

Figure 7:
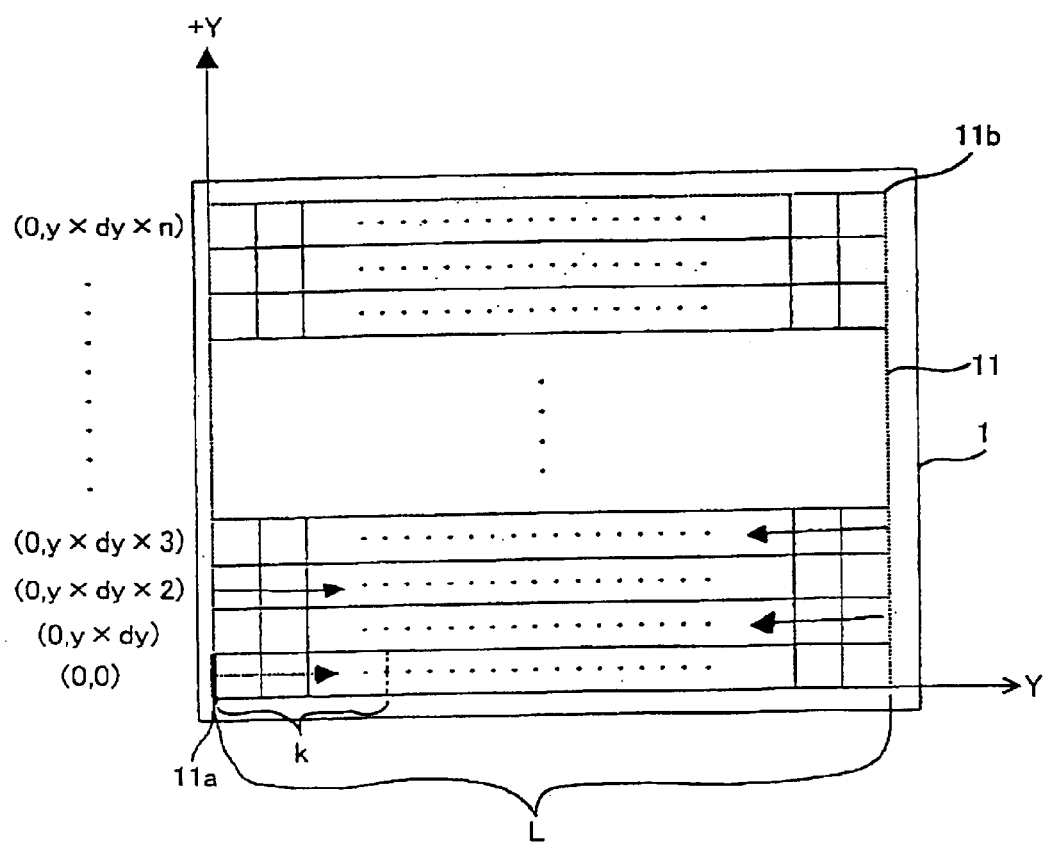
FIG. 7 is an explanatory view showing an imaging range and sequence of line images within a measuring region of the microscope apparatus of FIG. 1.
Figure 8:
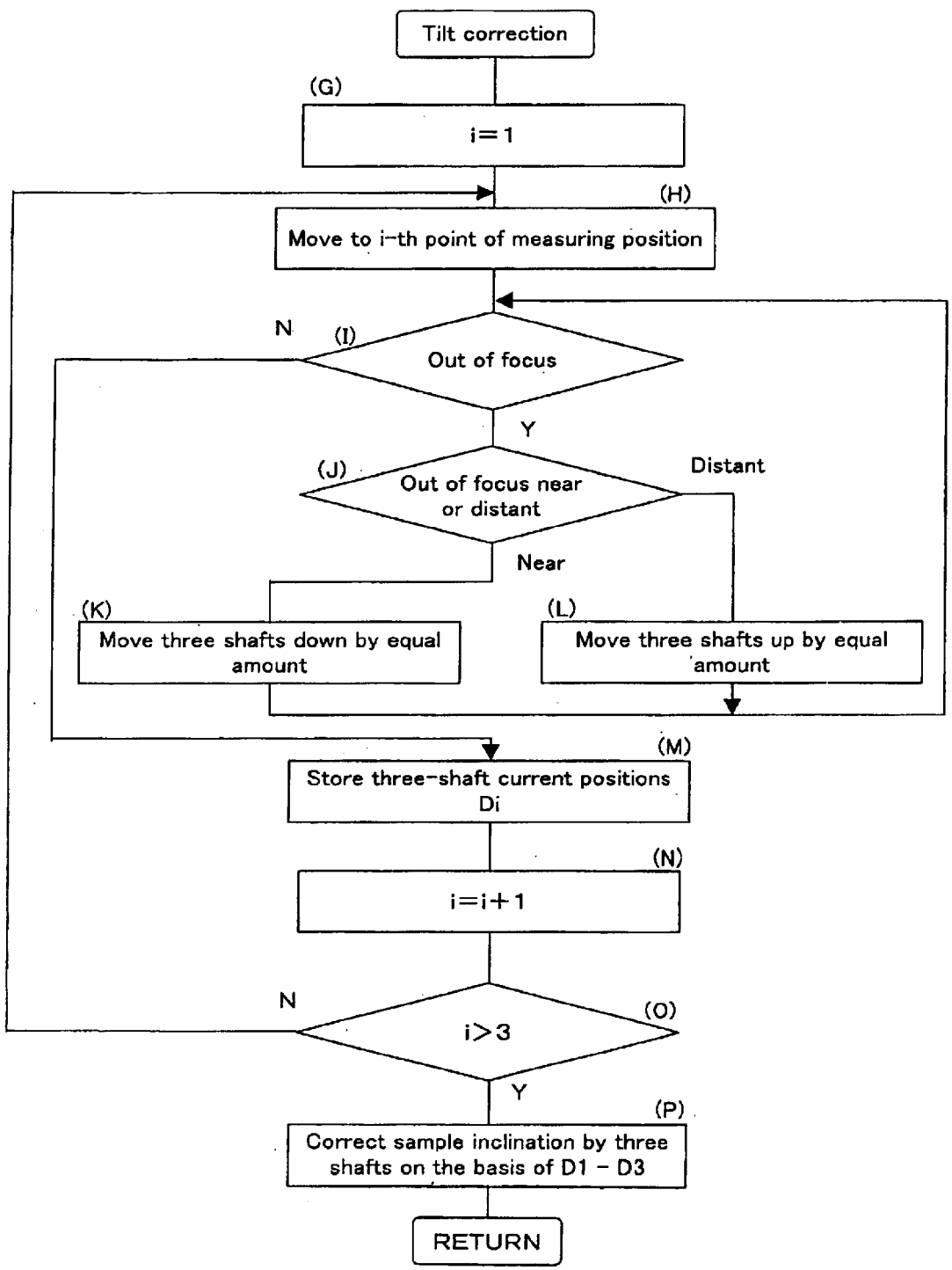
FIG. 8 is a flowchart illustrating a procedure for adjusting the focal length and inclination of a sample using the microscope apparatus of FIG. 1.

The measuring region 11 as shown in FIG. 7 is on the surface of the track-detecting solid matter 1, in a rectangular range where etch pits are to be actually imaged. The reason for designating a measuring region 11 is because, in the case that the track-detecting solid matter 1 is different in size, there is a need for imaging within a range that does not extend outside the periphery of the track-detecting solid matter 1, and for setting a start point 11a and an end point 11b of a line image to be sequentially imaged by the line sensor 4. Although the measuring region 11 can be set visually using the eyepiece lens 35, operability can be greatly improved by setting the measuring region 11 by displaying an image of the track-detecting solid matter 1 in a display part 52 of the computer.

In the presently described embodiment, an image from the line sensor 4 is sent to the determining means 5. Although the image can be displayed on the display section 52 and used to set a measuring region 11 while viewing the imaging screen, because each of line images taken by the line sensor 4 has an extremely narrow width in the range of 0.7 µm as described above, it is difficult to confirm a peripheral part of the track-detecting solid matter 1. Accordingly, it is practically impossible to set a measuring region 11 that does not extend beyond the periphery of the track-detecting solid matter 1.

Accordingly, in the presently preferred embodiment, a measuring region 11 is set by use of a two-dimensional CCD sensor 332 capable of two-dimensional image broadening to a certain extent.

Setting a measuring region 11 is performed by moving/adjusting the moving means 2 in XY directions according to an instruction from the input means 53 of the personal computer while viewing an imaging screen on which the region of an imaging region E (see FIG. 5) of the two-dimensional sensor 332 is projected. Namely, by use of the two-dimensional CCD sensor 332 a corner position 11a at one end of a diagonal line of the rectangular track-detecting solid matter 1 is located, as shown in FIG. 7, and set as an imaging start point by the line sensor 4. Next, a corner position 11b at the other end of the diagonal line is located and set as an imaging end point. The coordinates of the start and end points are recognized by the personal computer. Due to this, the XY coordinates of the points 11a, 11b are stored as information corresponding to a movement start point and end point of a linear motor of the moving means 2 by the operation processing section 51 of the personal computer. Accordingly, when imaging by the line sensor 4, an instruction from the operation processing section 51 controls the linear motor of the moving means 2 to be sequentially moved from the inward position 11a as a first imaging position to the horizontal position 11b as a last imaging position.

After the setting of a measuring region 11 is complete (C), adjustment is then made for focal length and inclination of the track-detecting solid matter 1 (D). This adjustment is automatically performed by the procedure shown in FIG. 8 according to an instruction from the operation processing section 51 of the personal computer, on the basis of the information from the focusing means 331 having the laser projecting means provided on the AF unit 33.

An explanation is now given as to why inclination and focal length adjustments of the track-detecting solid matter 1 are carried out using focusing means 331 having the light projecting means. Namely, as described above, the present invention has the line sensor 4 and the two-dimensional CCD sensor 332 mounted on the AF unit 33. Accordingly, the focal length can be automatically set by these sensors as in the typical CCD camera.

However, use of the line sensor 4 or the two-dimensional CCD sensor 332 to perform inclination and focal length adjustments involves the following problem. Automatic focal length adjustment in the typical CCD camera having a two-dimensional sensor 332 is performed by obtaining a focal position at which an obtained image has the maximum sharpness, i.e., wherein the image contrast is strongest. Consequently, when performing focal length adjustments using a two-dimensional CCD sensor 332, there is a need to examine a large number of focal lengths to determine maximum contrast value. This is a time-consuming process. If a line sensor is used to perform this process, the amount of time would be even greater because a line sensor acquires images in an extremely narrow width range. Moreover, there is difficulty in detecting image contrast in such narrow images.

Consequently, the present invention utilizes laser-projecting focusing means 331 for measuring the focal length with extremely high accuracy and at a high speed.

Referring again to FIG. 8, an explanation will now be provided of the procedure for adjusting the inclination of the track-detecting solid matter 1. This adjustment is controlled according to a program incorporated in the operation processing section 51 of the personal computer. First, the operation processing section 51 sets a central part of the measuring region 11 on the track-detecting solid matter 1 as a measuring point i=1 (G), to move the moving means 2 such that the optical axis of the microscope 3 coincides with an XY coordinate position thereof (H). At this position, a laser spot is projected from the light projecting part 331b, 331d, to determine whether or not the distance to the track-detecting solid matter 1 deviates with respect to a proper focal length (I).

Figure 9A:
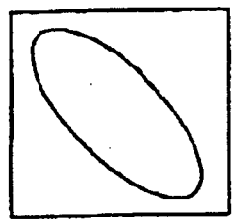
FIGS. 9A–9C are image figures showing examples of reflection shapes of a projected laser spot.
Figure 9B:
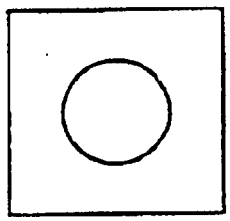
Figure 9C:
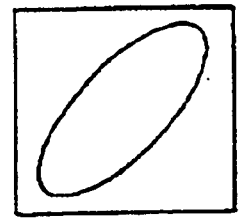

The deviation with respect to a proper focal length is determined based on the shape of the reflection light incident on the light-receiving means 331a, 331c. Namely, the shape of the reflection light is circular as shown in FIG. 9B when in a proper focal length. In the case of being closer than a proper focal length, it is deformed in a leftward oblique manner as shown in FIG. 9A; while, in the case of being farther than a proper focal length, it is deformed in a rightward oblique manner as shown in FIG. 9C. Accordingly, the operation processing section 51 recognizes the form of the reflection light incident on the light-receiving section 331a, 331c. In the case there is a deviation in focal length, a determination is made whether the distance is longer (farther) or shorter (closer) than the proper focal length (J). In the closer case, the output shafts 61a of the three ultrasonic motors 61 of the tilting table 6 are lowered by the same amount and aligned to the proper focal length (K). Conversely, in the farther case, the output shafts 61a of the three ultrasonic motors 61 of the tilting table 6 are raised by the same amount and aligned to the proper focal length (L). By the above, the measuring point i=1 is set to the proper focal length position (M).

Next, the deviation of focal length of the two measuring points (i=2, 3) is measured similarly. Namely, the operation measuring section 51 sets a second measuring point i=2 which is distant by a predetermined distance from the measuring point i=1 (N), to move the moving means 2 such that the optical axis of the microscope 3 coincides with the XY coordinate position thereof (H). At this position, a laser spot is projected to calculate and record a deviation amount between the measurement distance and the proper focal length (M) by a similar means to that described above. The operation measuring section 51 then sets a third measuring point i=3 which is distant by a predetermined distance from the measuring point i=1, to move the moving means 2 to the XY coordinate position thereof (H). Similarly to the above, a deviation amount between the measurement distance and the proper focal length is calculated and recorded (M). Incidentally, after measurement at the measuring point i=3, the measurement of focal length is ended by a determining equation i>3 (O).

By the above, because of a revealed deviation amount from the proper focal length in the respective XY coordinate positions at three measuring points i=1, 2 and 3, an inclination in XY direction of the track-detecting solid matter 1 is geometrically calculated from this three-dimensional coordinate position, making it possible to calculate respective vertical adjustment amounts of the output shafts 61a of the three ultrasonic motors 61 needed to correct the deviation amount. The operation processing section 51 adjusts the draw-out amount of the output shafts 61a of the three ultrasonic motors 61 on the basis of the calculation result, thus adjusting the inclination amount (P).

As discussed above, the tilting table 6 is moved by the moving means 2 such that the surface of the imaging section of the track-detecting solid matter 1 becomes horizontal.

Figure 10:
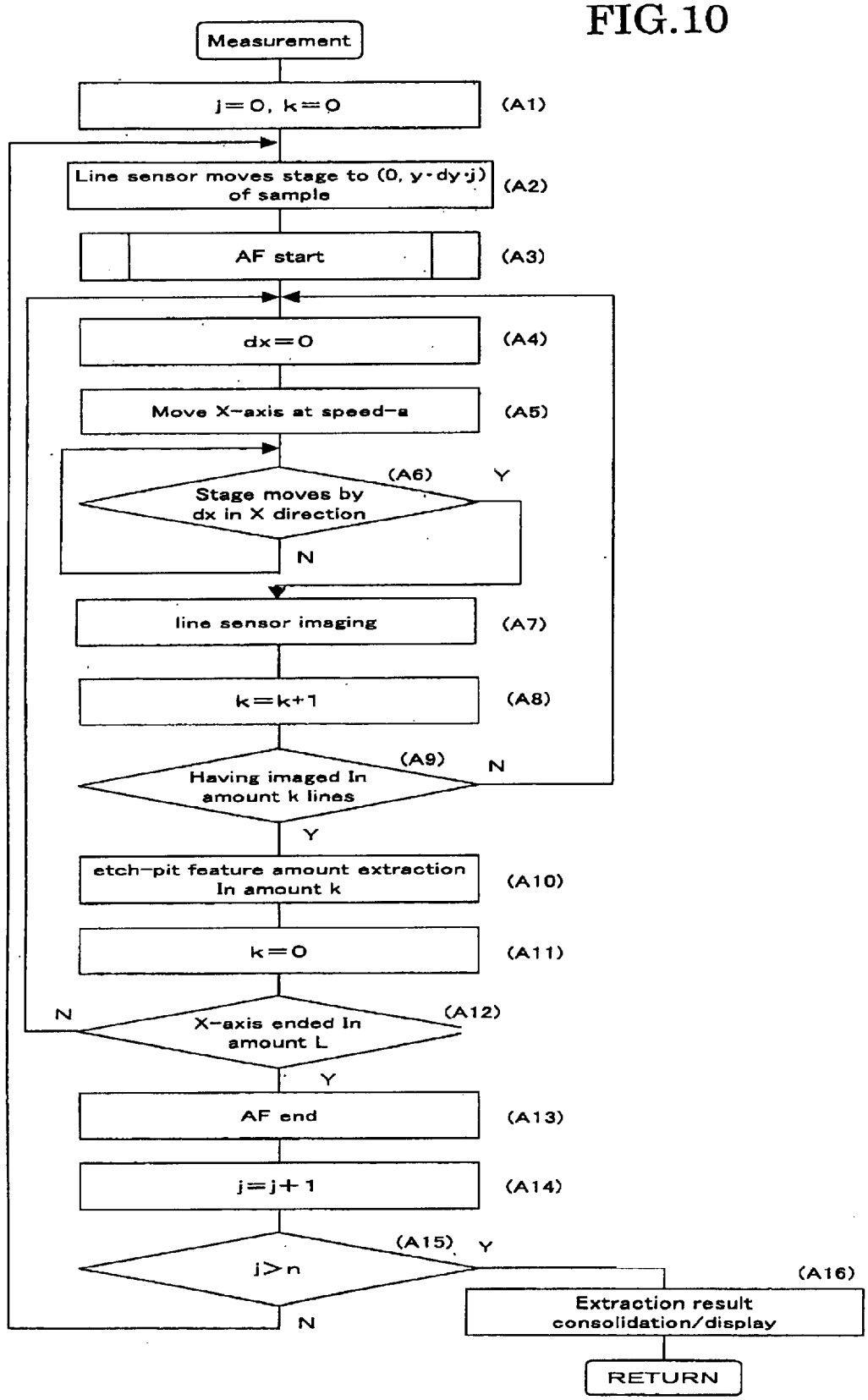
FIG. 10 is a flowchart showing an imaging procedure of a line image.

With reference to FIG. 10, an explanation will now be provided of the procedure used to image the track-detecting solid matter 1 using the line sensor 4. This imaging process is performed under control of a program stored and executed by the operation processing section 51 of the personal computer. First, the operation processing section 51 sets a measuring position j=0, k=0 by an encoder (A1), and recognizes this measuring position j=0 as a coordinate X=0, Y=0 (0, dy×j). The track-detecting solid matter 1 is moved to this XY coordinate (0, 0) by the moving means 2 (A2). This XY coordinate (0, 0) position is the lower left corner 11a in the measuring region 11 shown in FIG. 7, which point is a start point for starting imaging.

Figure 11:
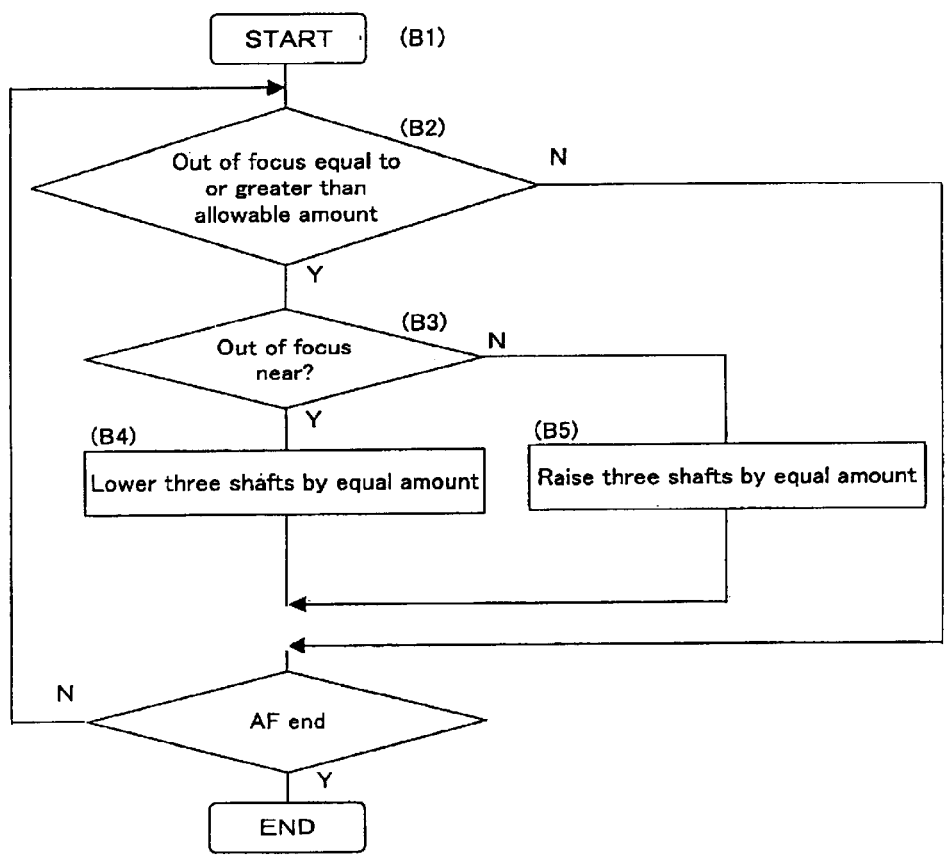
FIG. 11 is a flowchart showing a procedure for focal-length deviation amount adjustment.

The case wherein the start point imaging position is set at the lower left corner 11a of the measuring region 11 is described. The operation processing section 51 makes a focal adjustment (focal-length adjustment) using the focusing means 331. If the image is out of focus, the three ultrasonic motors 61 are driven by the same amount to carry out focal adjustment (A3). Namely, as shown in FIG. 11, focal adjustment is started (B1). The operation processing section 51 determines, from the information obtained from the focusing means 331, whether the out-of-focus amount is equal to or greater than an allowable amount (B2). Assume that the out-of-focus amount is equal to or greater than an allowable amount. In case the deviation is near (B3), the output shafts 61a of the three ultrasonic motors 61 of the tilting table 6 are lowered by the amount corresponding to the deviation (B4), thus being adjusted to the proper focal length. Conversely, in the case the deviation is far, the output shafts 61a of the three ultrasonic motors 61 of the tilting table 6 are raised by the amount corresponding to the deviation (B5). Then, an X-axis moving amount dx=0 is set (A4), to record a line image taken by the line sensor 4 in the measuring position (0, 0), and the moving means 2 is started to move at a constant speed in the X direction (A5). The moving amount of the moving means 2 is measured by the encoder and the data is sent to the operation processing section 51. When the operation processing section 51 determines that the moving means 2 has moved the measuring region 11 by one measuring width of line sensor 4 in the X direction (A6), similarly recorded is a line image of the line sensor 4 in a second measuring position (1dX, 0) (A7). The operation processing section 51 adds 1 to k each time recording is made by one line (A8). The operation processing section 51 sequentially records line images, concerning a range of one column having an X-direction length L, until the moving means 2 moves at a constant speed in the X direction and the measuring position comes to the lower right corner of the measuring region 11 shown in FIG. 7.

In the case the line image has been recorded in an amount of k lines, or 25% of the length L in the X direction (corresponding to the region k of FIG. 7) (A9), the operation processing section 51 carries out an etch-pit feature amount extraction in an amount of the region k concurrently with line image recording (A10). After etch-pit extraction, k is set to k=0 (A11). The etch-pit feature amount extraction is carried out as follows; the operation processing section 51 recognizes an etch-pit form in an image within the region k, collates and compares it with a previously recorded etch-pit pattern to determine an etch-pit kind to thereby totalize and record the kind-based quantity. Namely, the operation processing section 51, while recording the line image in a length L in X direction, carries out etch-pit feature amount extraction, each time data in 25% of the length L is input, depending upon the inputted data concurrently with line-image recording operation. Accordingly, when ending the scanning over a range of one column having a length L, etch-pit feature amount extraction is carried out four times.

When taking in the data imaged at the lowest stage of the measuring range 11, i.e. Y=0, is completed (A12), the operation processing section 51 ends the focus adjusting operation (A13), and sets j=1 to the encoder (A14) and causes the moving means 2 to move the measuring position to a position of XY coordinate=L, Y=dY (L, dY×j). This position is a position that is rightward by L in the X direction from the lower left corner 11a of the measuring region 11 shown in FIG. 7 and moved by a length of line sensor 4 in the Y direction. Then, in a position of the Y coordinate=dY, line images are sequentially taken from the right end to the left end of the measuring region 11. In this manner, while sequentially changing the scanning direction of line images from right-to-left or from left-to-right, the operation processing section 51, at an instant the line sensor 4 moves to a new imaging range, records line images sequentially together with measuring coordinate. When j>n is reached (A15), the operation processing section 51 determines that the entire region of the measuring range has been imaged, and causes the display section 52 to display a consolidation of extraction result and display of entire region (A16).

In the above successive imaging process, deviation from the proper focal length is checked each time an image is obtained by the foregoing procedure (referred to as focal adjustment). If there is a deviation in excess of an allowable amount, focal-length adjustment is performed. At the same time, the line sensor sequentially takes line-images when the image range moves to the left or the right by one step as described above. Accordingly, the focal-length adjustment of a line image to be taken is previously completed before the line image is taken, i.e., before the imaging range moves. In order to realize this, the laser spot shown in FIG. 4 is projected at all times to a position forward of the imaging range B of the moving line image. For example, of the imaging range B of the line image moves to rightward, there is a need to project a laser spot to a position C1 on the right-hand side of the imaging range B. In the case that the imaging range B of line image moves leftward, there is a need to project a laser spot to a position C2 on the left-hand side of the imaging range B.

As described above, when a line image acquired by the line sensor 4 has completed one column of imaging in the X direction, the track-detecting solid matter 1 is moved by an amount of the line-sensor length in the Y direction by the moving means 2 to repeat imaging one column in the X direction. In this case, if the movement in X direction is always in the same direction, e.g. from left to right, there is a need for operation, on each column, to return the track-detecting solid matter 1 to the left end. Accordingly, quick imaging is made possible by changing the X-direction moving direction based on each column into a zigzag movement, e.g. movement of from right-to-left next to the movement of from left-to-right.

In the case of zigzag movement, there is a need to change a laser-spot projecting position depending upon an advancing direction thereof. Since the change in laser-spot projecting position by a single light-projecting and light-receiving section would require an extremely complicated switching structure. For that reason, two light-projecting sections 331b, 331d and two light-receiving sections 331a, 331c are provided for enabling a simple change in the advancing direction of the sample.

Incidentally, the structure of the line sensor 4 is not limited to the case of arranging CCDs, one by one, in the number of approximately 4000, but several in each may be arranged in a longer length. Also, the smaller the size of each pixel of the line sensor 4, the higher the resolution of the acquired image. However, when using larger-sized pixels, by increasing the magnification of imaging, an image can be taken with excellent resolution. Determining an etch-pit kind, adding the kind-based quantities and the like, considering the reduction of process time, is desirably conducted by a procedure to carry out based on a predetermined range of a measuring region 11 as stated above, e.g., based on a 25% part of a one column range having a length L, for final totalizing. However, it is possible to carry out in batch after obtaining an image by one column range or obtaining a line image over the entire range of a measuring range 11.

Meanwhile, it can be easily structured to display a taken image from the two-dimensional CCD sensor 332 or laser-spot reflection image on the display section 53, so that the moving means 2 or tilting table 6 can be adjusted by manual input from the input means 52 while viewing the display screen.

Incidentally, the two-dimensional CCD sensor 332 is not limited to that described above but may be a solid-state imaging device such as a CMOS sensor.

Since a light projecting position of the light-projecting means is provided in the vicinity of a range of imaging performed by a line sensor, focal adjustment is correctly performed upon taking an image by the line sensor. Also, when providing two light projecting means comprised of a forward light projecting means and a backward light projecting means, even if the line sensor is scanned bi-directionally alternately left and right, focal adjustment is possible at a position forward of the imaging range by the line sensor. Thus, focal adjustment is correctly performed.

Also, because focal length is adjusted by the adjusting means for adjusting an inclination of the support base, there is no need to provide two adjusting means for inclination adjustment and focal adjustment, thus making the structure simple. Due to this, precise image can be swiftly taken by the simple structure.

Also, there are provided both the line sensor and the two-dimensional CCD sensor. By the line sensor, sample imaging can be swiftly made. By using the two-dimensional CCD sensor capable of taking an image of two-dimensional spread, an in-sample imaging range can be swiftly and easily set.

What is claimed is:

1. A microscope apparatus comprising: a sample table for supporting a sample, the sample table being mounted to undergo movement in a horizontal direction at a constant speed; a line sensor for acquiring a line image for each of a plurality of measuring positions of the sample in accordance with movement of the sample at a constant speed by one measuring width of the line sensor in the horizontal direction; image processing means for producing an image of the sample based on the line images acquired by the line sensor; and focusing means having light-projecting means for projecting light onto the sample at position forward of a leading side of an imaging range of the line sensor in the horizontal direction to prevent projected light that has been reflected by the sample from being incident on and interfering with the line images acquired by the line sensor.

2. A microscope apparatus according to claim 1; further comprising a frame on which the line sensor and the focusing means are mounted.

3. A microscope apparatus according to claim 2; wherein the focusing means is mounted within a barrel of the optical microscope and projects the light along an optical axis of the optical microscope.

4. A microscope apparatus according to claim 2; wherein the light-projecting means of the focusing means comprises a laser light source; and the focusing means further comprises light-receiving means for receiving laser light reflected by the sample and means for determining a proper focal length of the sample based on deformation of the reflected laser from a desired form.

5. A microscope apparatus according to claim 1; wherein the light-projecting means has forward light projecting means for projecting light onto the sample forward of a leading side of an imaging range of the line sensor and backward light projecting means for projecting light onto the sample rearward of a trailing side of an imaging range of the line sensor.

6. A microscope apparatus according to claim 1; further comprising moving means for moving the sample table to undergo movement along the horizontal plane at a constant speed.

7. A microscope apparatus comprising: a support base for supporting a sample, the support base being mounted to undergo movement in a horizontal direction at a constant speed; an optical microscope for producing a magnified image of the sample; adjusting means for adjusting an inclination of the support base and a focal length of the optical microscope; a line sensor for acquiring a line image of the magnified image for each of a plurality of measuring positions of the sample in accordance with movement of the sample at a constant speed by one measuring width of the line sensor in the horizontal direction; image processing means for producing an image of the sample based on the line image acquired by the line sensor; and focusing means having light-projecting means for projecting light onto the sample at a position forward of a leading side of an imaging range of the line sensor in the horizontal direction to prevent projected light that has been reflected by the sample from being incident on and interfering with the line images acquired by the line sensor.

8. A microscope apparatus according to claim 7; wherein the focusing means is mounted within a barrel of the optical microscope and projects the light along an optical axis of the optical microscope.

9. A microscope apparatus according to claim 7; wherein the light-projecting means of the focusing means comprises a laser light source; and the focusing means further comprises light-receiving means for receiving laser light reflected by the sample and means for determining a proper focal length of the sample based on deformation of the reflected laser from a desired form.

10. A microscope apparatus according to claim 7; wherein the support base is supported at at least three points; and wherein the adjusting means vertically adjusts the support base at least at the three points.

11. A microscope apparatus according to claim 7; wherein the adjusting means is controlled by a signal output by the focusing means.

12. A microscope apparatus according to claim 7; wherein the adjusting means is controlled by a signal output by the focusing means.

13. A microscope apparatus according to claim 7; further comprising moving means for moving the support base to undergo movement along the horizontal plane at a constant speed.

14. A microscope apparatus comprising: a sample table for supporting a sample, the sample table being mounted to undergo movement in a horizontal direction at a constant speed; a microscope for producing a magnified image of the sample; a line sensor for acquiring a line image of the magnified sample image for each of a plurality of measuring positions of the sample in accordance with movement of the sample at a constant speed by one measuring width of the line sensor in the horizontal direction; a two-dimensional charge coupled device for obtaining an image of a region of the sample to be imaged by the line sensor; image processing means for producing an image of the sample based on the line image acquired by the line sensor; and focusing means having light-projecting means for projecting light onto the sample at a position forward of a leading side of an imaging range of the line sensor in the horizontal direction to prevent projected light that has been reflected by the sample from being incident on and interfering with the line images acquired by the line sensor.

15. A microscope apparatus according to claim 14; further comprising moving means for moving the sample table to undergo movement along the horizontal plane at a constant speed.

16. A microscope apparatus according to claim 14; further comprising adjusting means for adjusting an inclination of the sample table and a focal length of the microscope.

17. A microscope apparatus according to claim 16; wherein the sample table is supported at at least three points; and wherein the adjusting means vertically adjusts the sample table at least at the three points.

18. A microscope according to claim 16, wherein the adjusting means is controlled by a signal output by the focusing means.

* * * * *